US012693866B2

(12) United States Patent
Gallego et al.

(10) Patent No.: US 12,693,866 B2
(45) Date of Patent: Jul. 28, 2026

(54) ACTIVATING A COPROCESSOR TO TRANSFORM QUEUED DATA ASSOCIATED WITH A TOPIC

(71) Applicant: Redpanda Data, Inc., San Francisco, CA (US)

(72) Inventors: Alexander Gallego, San Francisco, CA (US); Robert Blafford, Staten Island, NY (US)

(73) Assignee: Redpanda Data, Inc., San Francisco, CA (US)

( * ) Notice: Subject to any disclaimer, the term of this patent is extended or adjusted under 35 U.S.C. 154(b) by 153 days.

(21) Appl. No.: 17/576,625

(22) Filed: Jan. 14, 2022

(65) Prior Publication Data

US 2022/0222080 A1     Jul. 14, 2022

Related U.S. Application Data

(60) Provisional application No. 63/137,416, filed on Jan. 14, 2021.

(51) Int. Cl.
  *G06F 9/38*     (2018.01)
  *G06F 9/54*     (2006.01)

(52) U.S. Cl.
  CPC ............ *G06F 9/3877* (2013.01); *G06F 9/546* (2013.01)

(58) Field of Classification Search
  CPC ............................... G06F 9/3877; G06F 9/546
  See application file for complete search history.

(56) References Cited

U.S. PATENT DOCUMENTS

| | | | | |
|---|---|---|---|---|
| 6,889,244 B1 * | 5/2005 | Gaither | .................... | G06F 9/54 |
| | | | | 709/213 |
| 9,678,812 B2 * | 6/2017 | Arimilli | ................... | G06F 9/54 |
| 10,019,364 B2 | 7/2018 | Shetty et al. | | |
| 10,310,897 B2 * | 6/2019 | Drysdale | .............. | G06F 9/5044 |
| 10,313,219 B1 * | 6/2019 | Burcham | .............. | H04W 24/02 |
| 11,074,196 B1 | 7/2021 | Aleti et al. | | |
| 2003/0174708 A1 * | 9/2003 | Van Asten | ............ | H04L 49/103 |
| | | | | 370/395.7 |

(Continued)

OTHER PUBLICATIONS

Data Structure Handbook—Queues, 2019, 8 pages, Retrieved from the Internet < URL: https://www.thedshandbook.com/queues/ >.*

(Continued)

*Primary Examiner* — David J. Huisman

(74) *Attorney, Agent, or Firm* — Young Basile Hanlon & MacFarlane, P.C.

(57)     ABSTRACT

Disclosed herein are methods, apparatuses and systems for transforming data within a queuing system, including activating a first coprocessor for a first topic in the queuing system based on a first script identified for the first topic, obtaining a first initialization offset identifying a position in a queue of data elements associated with the first topic, storing a first coprocessor offset based on the first initialization offset, obtaining a last offset identifying a position of a last received data element in the queue of data elements associated with the topic, executing the first coprocessor against a first data element from a queue of data elements based on a comparison between the first coprocessor offset and the last offset to produce a first transformed data element, and storing the first transformed data element in a first materialized topic associated with the first topic.

15 Claims, 10 Drawing Sheets

(56)                    References Cited

U.S. PATENT DOCUMENTS

2016/0274951 A1\*    9/2016    Koizumi ............... H04L 47/125
2018/0089312 A1       3/2018    Pal et al.

OTHER PUBLICATIONS

Johnson, "Distributed System Fault Tolerance Using Message Logging and Checkpointing", Rice University, Dec. 1989, 141 pages.\*
Microsoft, "Blocking queues", Apr. 12, 2006, pp. 1-9.\*
Palino et al., "Chapter 4. Kafka Consumers: Reading Data from Kafka", Oct. 10, 2019, 39 pages.\*
Wikipedia, "Checksum", Dec. 31, 2020, pp. 1-4.\*
Sebastian, How to write WASM filters for Envoy and deploy it with Istio, Apr. 19, 2020, https://banzaicloud.com/blog/envoy-wasm-filter/, 20 pages.
Github, WebAssembly High-Level Goals, Nov. 15, 2017, Retrieved on Jan. 13, 2022, https://github.com/WebAssembly/design/blob/main/HighLevelGoals.md, 2 pages.
Github, WebAssembly Design, Nov. 15, 2017, Retrieved on Jan. 13, 2022, https://github.com/WebAssembly/design/blob/main/README.md, 3 pages.
Ongaro, D., et al., "In Search of an Understandable Consensus Algorithm (Extended Version)", Published May 20, 2014, <https://raft.github.io/raft.pdf> (18 pp).
Unknown, "The Raft Consensus Algorithm", <https://raft.github.io/>, Downloaded Sep. 25, 2020 (11 pp).
Das, A., et al., "SWIM: Scalable Weakly-consistent Infection-style Process Group Membership Protocol", <http://www.cs.cornell.edu/info/projects/spinglass/public_pdfs/SWIM.pdf> Downloaded Sep. 25, 2020 (10 pp).
Gallego, A., "Seastar: the future<> is here", <https://www.alexgallego.org/concurrency/smf/2017/12/16/future.html> Dec. 16, 2017 (8 pp).
Sax, M.J., "Apache Kafka", S. Sakr, A. Zomaya (eds.), Encyclopedia of Big Data Technologies, https://doi.org/10.1007/978-3-319-63962-8_196-1, <https://link.springer.com/content/pdf/10.1007%2F978-3-319-63962-8_196-1.pdf>, Downloaded Sep. 25, 2020 (8 pp).
Kreps, J., et al., "Kafka: a Distributed Messaging System for Log Processing", NetDB'11, Jun. 12, 2011, Athens, Greece. <http://pages.cs.wisc.edu/~akella/CS744/F17/838-CloudPapers/Kafka.pdf> (7 pp).
Amazon Web Services, "Amazon S3 Features", https://aws.amazon.com/s3/features/, Downloaded Sep. 25, 2020 (5 pp).
Amazon Web Services, "Amazon S3 Storage Classes", <https://aws.amazon.com/s3/storage-classes/>, Downloaded Sep. 25, 2020 (6 pp).
Wikipedia, "Column-oriented DBMS", <https://en.wikipedia.org/wiki/Column-oriented_DBMS> Downloaded Sep. 25, 2020 (7 pp).
Amazon Web Services, Amazon Simple Storage Service, "CopyObject", <https://docs.aws.amazon.com/AmazonS3/latest/API/API_CopyObject.html> , Downloaded Sep. 25, 2020 (12 pp).
Apache Software Foundation, "Apache Parquet", <https://parquet.apache.org/documentation/latest/> Downloaded Sep. 25, 2020 (7 pp).
Koshy, J., et al., "Kafka Mirroring (MirrorMaker)", <https://cwiki.apache.org/confluence/pages/viewpage.action?pageId=27846330> Last Modified Jun. 23, 2017 (3 pp).
Loza, R., "Mirror Maker v2.0", DZone, <https://dzone.com/articles/mirror-maker-v20>, Jun. 1, 2020 (13 pp).
Github, The Raft Consensus Algorithm, Retrieved on Aug. 13, 2020, https://raft.github.io/, 11 pages.
Seastar Documentation; https://web.archive.org/web/20201201095728/http://docs.seastar.io/master/index.html; Accessed Dec. 1, 2020; 1 page.
Fiber (compuer science); https://en.wikipedia.org/w/index.php?title=Fiber_(computer_science)&oldid=997247339; Last Modified Dec. 30, 2020; 3 pages.
Documentation; https://web.archive.org/web/20201123142756/https://v8.dev/docs; Accessed Nov. 23, 2020; 3 pages.

\* cited by examiner

TOPICS

MATERIALIZED
TOPICS

ACTIVATING A COPROCESSOR TO TRANSFORM QUEUED DATA ASSOCIATED WITH A TOPIC

CROSS-REFERENCE TO RELATED APPLICATION(S)

This Utility Patent Application claims the benefit of U.S. Patent Application Ser. No. 63/137,416 filed on Jan. 14, 2021 which is incorporated herein by reference in its entirety.

BACKGROUND

Queuing systems, such as Apache Kafka®, can be utilized in various computerized systems to receive and process large volumes of data. Queues can be utilized in a variety of fields, such as content delivery networks, telecommunications, messaging services, and other large-scale internet enabled applications. Some queuing systems permit data to be queued according to label (e.g., by topic) with the data associated with a label being organized in various partitions and/or segments across various computing and storage devices for later processing and storage.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features may be arbitrarily expanded or reduced for clarity.

DETAILED DESCRIPTION

Figure 1:
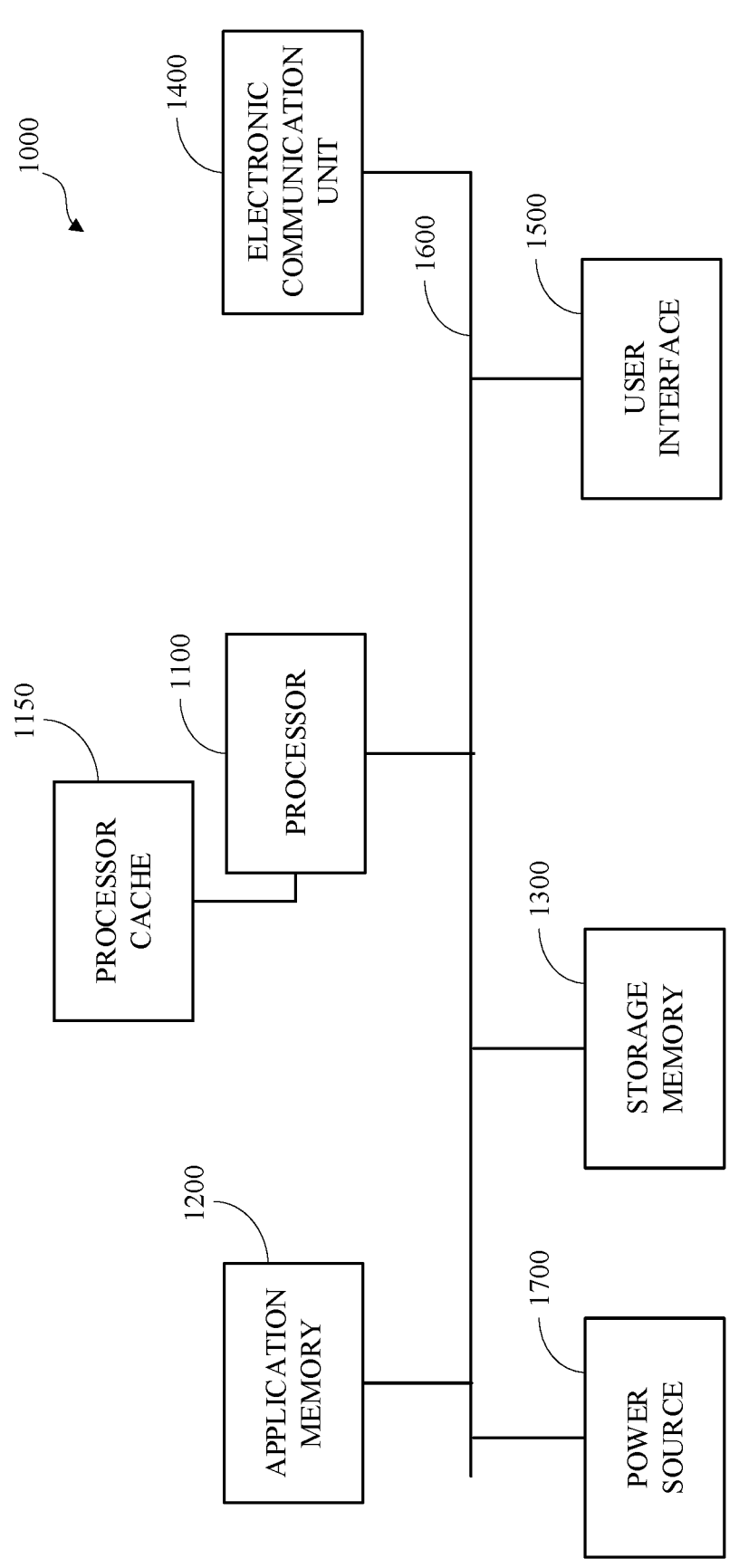
FIG. 1 is a block diagram of an example of a computing device.

Queuing systems are generally designed to permit the queuing of large amounts of data for later processing in order to decouple the production of data from the consumption of data. In general, a queuing system includes one or more queues, where data is consumed in the order in which it is received. An example queue is described in more detail with respect to FIG. 4. An example use case for a queuing system is described in more detail with respect to FIG. 5. A queue may be implemented in a queuing system as a topic.

A queuing system that can transform data elements in a topic in near real-time may provide functionality advantageous for consumers of a queuing system and may enable completion of tasks that otherwise would take more time, computation, memory, network resources, and power consumption. For example, data stored in queuing systems must increasingly be systematically modified for a variety of reasons, including legal and regulatory reasons, such as to protect personal information from disclosure or to anonymize or de-identify data. Numerous other use cases for transforming data elements in topics exist, including to normalize the format of data elements for later use.

The following disclosure describes implementations of a queuing system that includes transformation capabilities and associated techniques and systems thereto that permits the transformation of data elements while saving time, computation, memory, network resources, and/or power consumption as compared to existing systems while maintaining the correctness and completeness of the queuing system. For example, the tight integration of transformation capabilities within a queuing system may enable the saving of resources, for example, by permitting the avoidance of network traffic that may otherwise be difficult or not possible to avoid where transformation is performed separately from the queueing system and the queuing system is distributed among numerous computing devices and processor cores. For example, if transformation of data elements in a topic were performed externally to the queuing system, extra network resources, memory resources, and computing resources likely would be expended when retrieving the data elements from the topic and when a transformed data element is stored to a new topic, the publication of the transformed data element would consume network resources, memory resources, and computing resources to queue and store the transformed data element, including the resources needed to replicate the transform data element among the raft group to which transformed data element is received. Some or all of these resources may not need to be consumed if the transformation of data elements is tightly integrated with the queuing system itself, for example by transforming data elements on a same core or computing device where a data element is received and by avoiding replication of transformed data elements via raft. Replication can be avoided because all instances of the queuing system can be configured to perform the same transformation functions.

Implementations of the queuing systems described in this disclosure may utilize a data structure referred to as "iobuf" in order to achieve a queuing system that improves upon deficiencies found in existing queuing systems such as by utilizing zero-copy data handling of received data, such as described in U.S. Pat. No. 11,563,690 which is incorporated herein by reference in its entirety.

Implementations of the queuing systems described in this disclosure may be implemented in a tiered manner in order to achieve a queuing system that improves upon deficiencies found in existing queuing systems which may result in reduced network saturation, bandwidth utilization, latency, or resource utilization, such as described in U.S. Pa. No. 11,218,544 which is incorporated herein by reference in its entirety.

Implementations of the queuing systems described in this disclosure may utilize a mathematically proven fault tolerant protocol, such as raft. Raft is further described in "In Search of an Understandable Consensus Algorithm (Extended Version)" by Ongaro and Ousterhout, available at raft.github.io/raft.pdf. For example, implementations of this disclosure may utilize a so-called management raft group (also referred to as "raft0") to which all computing devices are a member (and in certain implementations, all cores of all computing devices). The management raft group can be used to identify which computing devices and/or cores are designated to process which queue requests in a queuing system.

FIG. 1 is a block diagram of an example of a computing device 1000. One or more aspects of this disclosure, such as the client and server devices shown in FIG. 2 may be implemented using the computing device 1000. The computing device 1000 includes a processor 1100, processor cache 1150, application memory 1200, storage memory 1300, an electronic communication unit 1400, a user interface 1500, a bus 1600, and a power source 1700. Although shown as a single unit, one or more elements of the computing device 1000 may be integrated into a number of physical or logical units. For example, the processor cache 1150 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may be connected to the processor cache 1150 for internal storage of operating data or instructions. For example, each core within processor 1100 may have a separate processor cache 1150 unit or may have specified memory locations allocated to it within processor cache 1150. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the processor cache 1150, application memory 1200, the storage memory 1300, the electronic communication unit 1400, the user interface 1500, the bus 1600, the power source 1700, or any combination thereof. The processor may execute, which may include controlling, which may include sending to and/or receiving electronic signals from, the application memory 1200, the storage memory 1300, the electronic communication unit 1400, the user interface 1500, the bus 1600, the power source 1700, or any combination thereof. Execution may be facilitated by instructions, programs, code, applications, or the like, which may include executing one or more aspects of an operating system, and which may include executing one or more instructions to perform one or more aspects described herein, alone or in combination with one or more other processors.

The application memory 1200 is coupled to the processor 1100 via the bus 1600 and may include any storage medium with application data access including, for example, DRAM modules such as DDR SDRAM, Phase-Change Memory (PCM), flash memory, or a solid-state drive. Although shown as a single block in FIG. 1, the application memory 1200 may be implemented as multiple logical or physical units. Other configurations may be used. For example, application memory 1200, or a portion thereof, and processor 1100 may be combined, such as by using a system on a chip design.

The application memory 1200 may store executable instructions or data, such as application data for application access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The storage memory 1300 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the storage memory 1300 may be implemented as multiple logical or physical units.

The storage memory 1300 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE) or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, a touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active matrix organic light emitting diode (AMO-LED), or other suitable display. In some implementations, the user interface 1500 may be part of another computing device (not shown), such as in addition to or instead of being part of the computing device 1000. In some implementations, the user interface 1500 may be omitted or implemented virtually using remote access technologies via the electronic communication unit 1400.

The bus 1600 is coupled to the application memory 1200, the storage memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
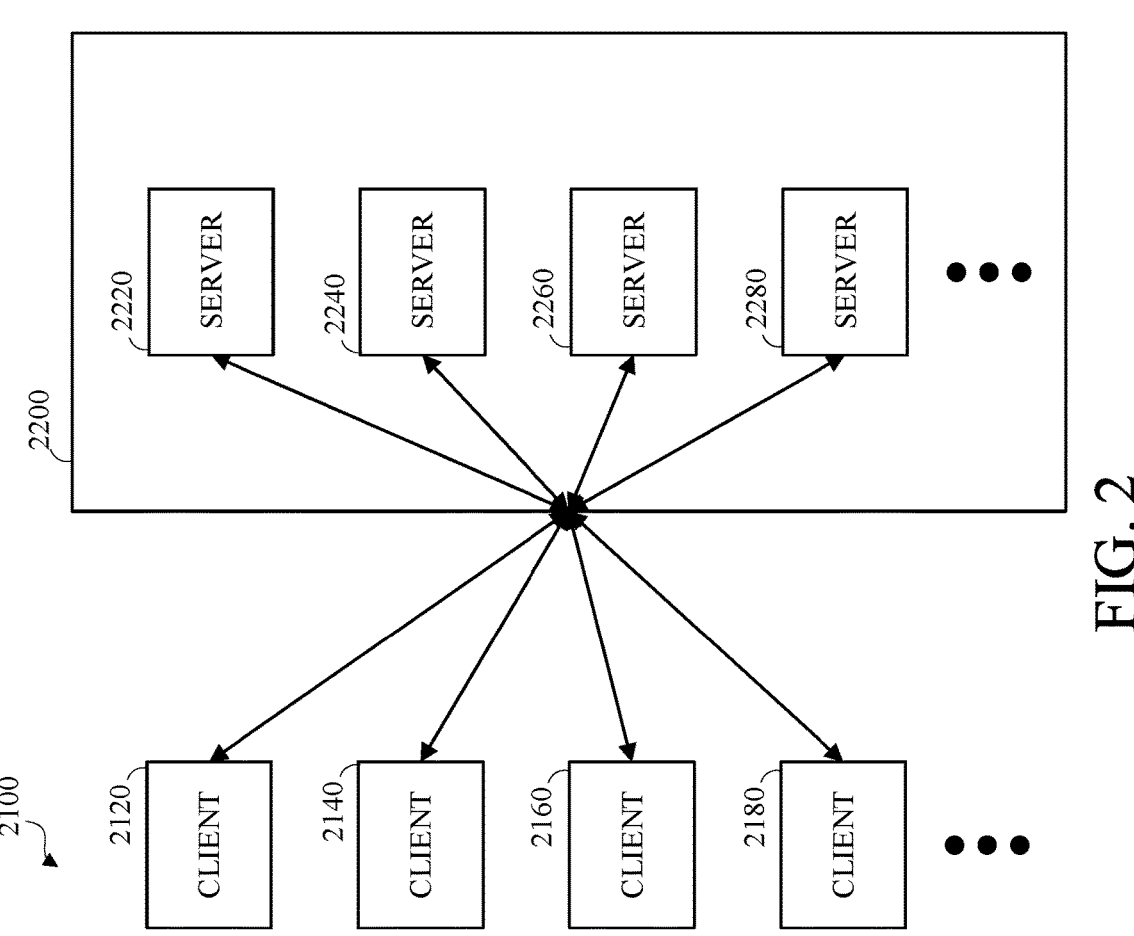
FIG. 2 is a block diagram of an example arrangement of computing devices used in a queuing system.

FIG. 2 is a block diagram of an example arrangement 2000 of computing devices used in a queuing system 2200. The computing devices can include a number of client devices 2100 and a number of server devices that comprise the queuing system 2200. As shown, there are four client devices 2120, 2140, 2160, and 2180 and four server devices 2220, 2240, 2260, and 2280. However, the number of client devices and server devices may vary depending on implementation. As described previously, the server devices 2220, 2240, 2260, and 2280 may implement a fault tolerant protocol that is mathematically proven, such as raft. Accordingly, queue batches and queue requests transmitted to the queuing system from one or more client devices may be routed or allocated to any one of the server devices 2220, 2240, 2260, and 2280 in a manner consistent with the raft protocol.

For example, queue batches or queue requests may be allocated randomly among the server devices 2220, 2240, 2260, and 2280 and if a queue request is not designated to be processed by the randomly assigned server device, such as the server device 2240, that server device may send a response message indicating which server device is designated to process that queue request, such as server device 2280. Alternatively, the server device 2240 may forward the message to the correct server device 2280.

In implementations of a queuing system, a queue may be implemented as a topic and a queueing system may permit the creation of multiple topics or queues. A queue request may identify a topic for which the queue request is intended, and certain server devices may be designated to process queue requests for a particular topic. A topic may be partitioned such that subsets of queue requests are processed respectively by different server devices and data associated with the respective subsets are stored on respective server devices. A queue request may include one or more data elements, each of which may include a key/value pair. The data elements in a queue request may be directed to the same or different topics.

Figure 3:
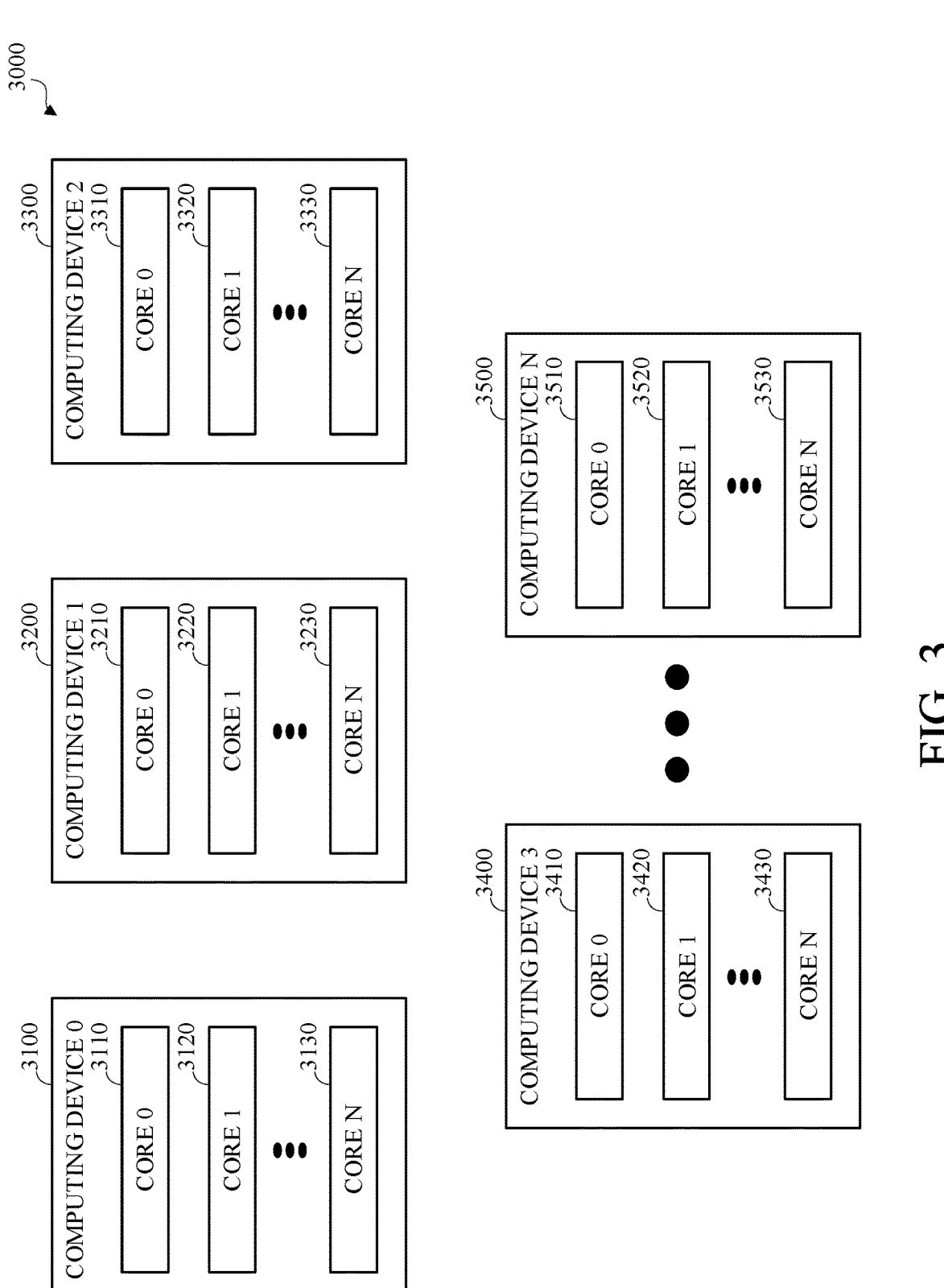
FIG. 3 is a block diagram of an example of a queuing system.

FIG. 3 is a block diagram of an example of a queuing system 3000. Queuing system 3000 includes computing devices 3100, 3200, 3300, 3400, 3500. As illustrated, queuing system 3000 includes 5 computing devices, however, implementations of this disclosure may have additional or fewer computing devices, for example, depending on the volume of queue requests, the capabilities of the computing devices, and the desired load factor of the computing devices. For example, the value of "N" could be 10 computing devices.

Each computing device 3100, 3200, 3300, 3400, 3500 may have a number of processing cores. For example, as shown, each computing device has three cores: 0, 1, and N—3110, 3120, 3130 for computing device 0 3100; 3210, 3220, 3230 for computing device 1 3200; 3310, 3320, 3330 for computing device 2 3300; 3410, 3420, 3430 for computing device 3 3400; and 3510, 3520, 3530 for computing device N 3500.

As previously explained, the computing devices in queuing systems implemented according to this disclosure can utilize a mathematically proven fault tolerant protocol, such as raft. In the example of FIG. 3, the management raft group or raft0 group can include all of the computing devices in the queuing system. Other raft groups for various partitions of topics processed by the queuing system can encompass varying numbers and members of computing devices which may be selected differently for various implementations. For example, a first raft group for a first partition of a first topic could encompass computing devices 0 3100, 1 3200, and 2 3300. For example, a second raft group for a second partition of a first topic could encompass computing devices 0 3100, 3 3400, and N 3500. Other raft groups could have the same or different members as these examples.

Figure 4:
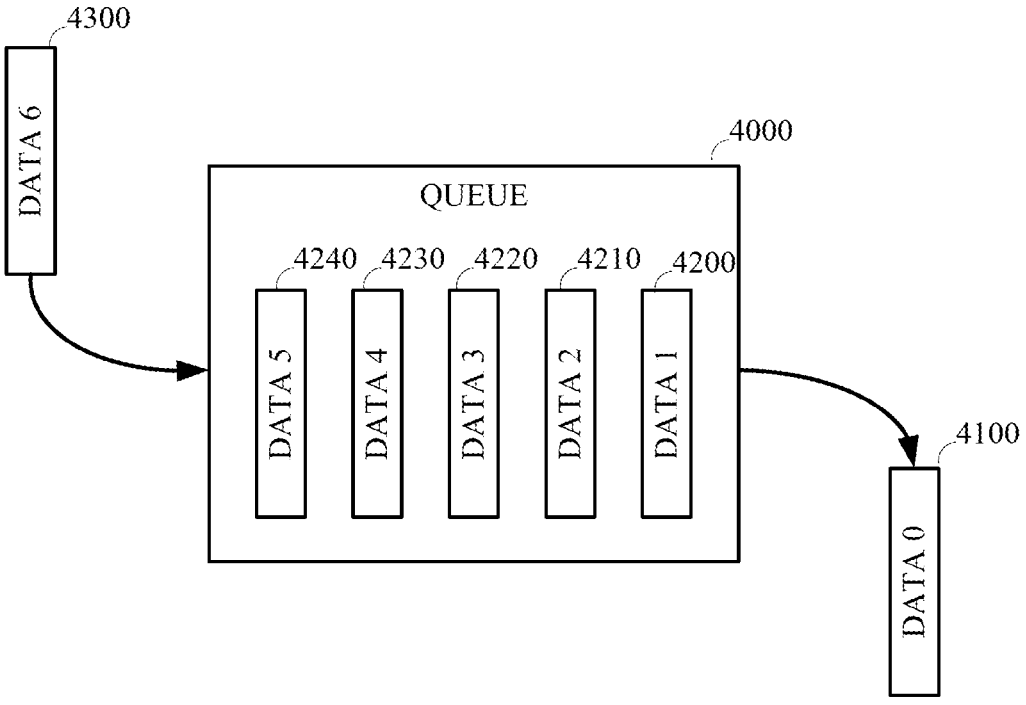
FIG. 4 is a block diagram illustrating an example of the operation of a queue.

FIG. 4 is a block diagram illustrating an example of the operation of a queue 4000. A queue is characterized by the property that data is consumed in the order in which it is received. For example, in the example shown, data 0 4100 is being consumed from the queue, the queue includes additional data elements data 1 4200, data 2 4210, data 3 4220, data 4 4230, and data 5 4240, in that order, and data 6 4300 is in the process of being added to the queue. In this example, the data elements were both received by the queue and will be consumed in the order data 0 4100, data 1 4200, data 2 4210, data 3 4220, data 4 4230, data 5 4240, and data 6 4300.

Depending on the implementation, the queue 4000 may persist data elements for a particular period of time or for an indefinite time and may retain or discard data elements when they are consumed. If data elements are not discarded once consumed, they may be retained in storage, such as in the form of a log of key/value pairs, for later retrieval and consumption. In implementations of a queuing system, a queue may be implemented as and/or referred to as a topic.

Figure 5:
FIG. 5 is a block diagram illustrating an example of a content and analysis system utilizing a queue.
Figure 5:
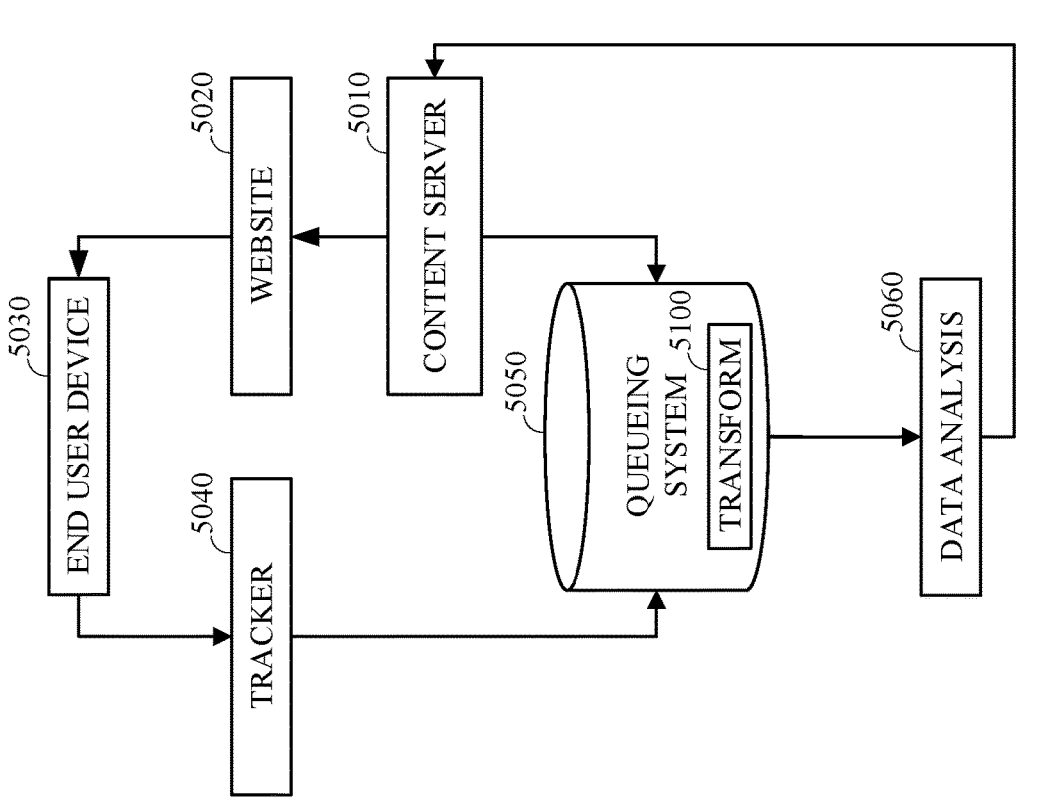

FIG. 5 is a block diagram illustrating an example of a content and analysis system 5000 utilizing a queue. The system 5000 includes a content server 5010 that provides content to a website 5020 for transmission and display by an end user device 5030. In some implementations, the content provided by the content server 5010 may be advertisements or other paid content. The content server 5010 is also configured to transmit to a queuing system 5050 information detailing the number of impressions, e.g., the number of times each piece of content is displayed to an end user device, such as the end user device 5030. For example, the information transmitted to the queuing system 5050 may include queue requests including key value pairs indicating the piece of content displayed and the end user to which it was displayed.

The system 5000 may also include a tracker 5040 which collects information about the interaction with the content on the end user device 5030. For example, the tracker 5040 may be configured to collect information when the content is clicked on. The tracker 5040 may be configured to send some or all of the collected information to the queuing system 5050. For example, the tracker 5040 may transmit to the queuing system 5050 queue requests including key value pairs indicating the pieces of content clicked on and the end users that clicked on the content.

The information queued in the queuing system 5050 may be consumed by a data analysis unit 5060. For example, the data analysis unit 5060 may be configured to analyze impressions and clicks over time to determine which content performs better with users and to adjust the content being provided by the content server 5010. In this use case, the queuing system 5050 serves to decouple data collection from data processing which may enable the processing of data collected over a longer time period and also may permit data to be collected at higher or irregular volumes than the consumer may be otherwise unable to effectively process.

The queuing system 5050 may include transform software 5100 which is configured to modify information queued by the queuing system 5050. For example, transform software 5100 may be configured to mask and/or remove data to anonymize the queued information or may change the queued information, for example to normalize the information (e.g., in terms of upper case/lower case characters). Other use cases are possible, such as, from a producer context, validating that a message conforms to a schema, data masking/encryption, inline enrichment such as hash joins, time based windowing such as to sort by key, calculate aggregations/rollups, etc., and topic routing such as by sending messages to different child topics depending on content. Use cases from a consumer context may include projection and filter pushdown (requires parameter passing), fine grained access controls—column or row level (requires access to entitlements metadata), and dynamic enrichment (similar to producer-side enrichment). The implementations described herein generally refer to transformation upon receipt of a data element, which may also be referred to as a producer use case. Other implementations are also available where, for example, transformations may be applied at the time data elements are consumed or requested by a user where transformed data elements are provided to a user instead of the originally requested data element. In some implementations, a virtual topic may be utilized to obtain data elements that are transformed on demand.

Transform software 5100 may operate asynchronously or synchronously on information processed by the queueing system 5050. For example, in an asynchronous mode, transformation of received information may be carried out independently of the storage of received information to disk and such transformations may occur after information is stored to disk. For example, in a synchronous mode, transformations may occur as information is received and prior to the received information being stored to disk. For example, in some implementations of a synchronous mode, the originally received information may not be stored and only the transformed information may be stored. In some implementations, transformed information may be stored in a materialized topic which is created for the purpose of storing transformed information. In some implementations there may be one or more materialized topics associated with a particular topic. Transform software 5100 may take different forms depending on implementation and may include multiple software programs or modules that execute independently and/or cooperatively in order to implement the transformation of information in the queueing system 5050, for example according to implementations as described later with respect to FIGS. 5-11.

The addition of transform software 5100 permits queuing system 5050 to operate as a full Turing complete system in addition to publish/subscribe functionality to which a queuing system may typically be limited. Implementations of queuing system 5050 and transform software 5100, such as those described herein may be designed to provide a system that produces an output queue (e.g., in the form of a materialized topic) that is at least (a) correct (e.g., for the offset range in which output is produced, the output data elements will be correct according to the associated transform script) (b) complete (e.g., all data elements will be processed prior to the current offset for the script for a particular materialized topic), and (c) provides compute capabilities (by transforming data elements utilizing transform software 5100). In the event that a transform script produces an error or output that would not satisfy the foregoing conditions, an error will be returned instead of adding an incorrect data element to the output queue or advancing the offset of the output queue. In some implementations, a script may include a filtering operation which may include not producing a corresponding transformed data element for an input data element. Such a result is considered correct because no output is the desired output according to the filtering operation and is considered complete because the script was executed properly on the input data element, even though there is no associated transformed data element. In other words, a correctly populated materialized topic may have fewer data elements than its associated topic.

Transformation software 5100 may be implemented at least in part utilizing a virtual instruction set architecture (virtual ISA) which provides a binary format to which programs may be compiled for later execution in a virtual machine that is a memory-safe, sandboxed execution environment. Such a virtual machine may be designed to translate programs written in the virtual ISA to machine language native to the hardware on which the virtual machine is executed for fast execution. Utilizing such a virtual ISA may advantageously permit support for multiple programming languages and may provide built-in features including security features. For example, Web Assembly (wasm) may be used as the virtual ISA and a virtual machine, such as V8 may be utilized to execute scripts or programs written in wasm and/or other languages, such as JavaScript. A runtime engine may be used in connection with the virtual machine, such as Node.js. Transform scripts may execute in the runtime engine and/or the virtual machine in order to transform data elements, using functions such as map( ) and/or filter( ).

The system 5000 as shown depicts only one example of a system in which a queuing system may be used. Many other use cases are possible. For example, a queuing system may be utilized in many systems in which it is desirable to decouple data collection and processing.

Figure 6:
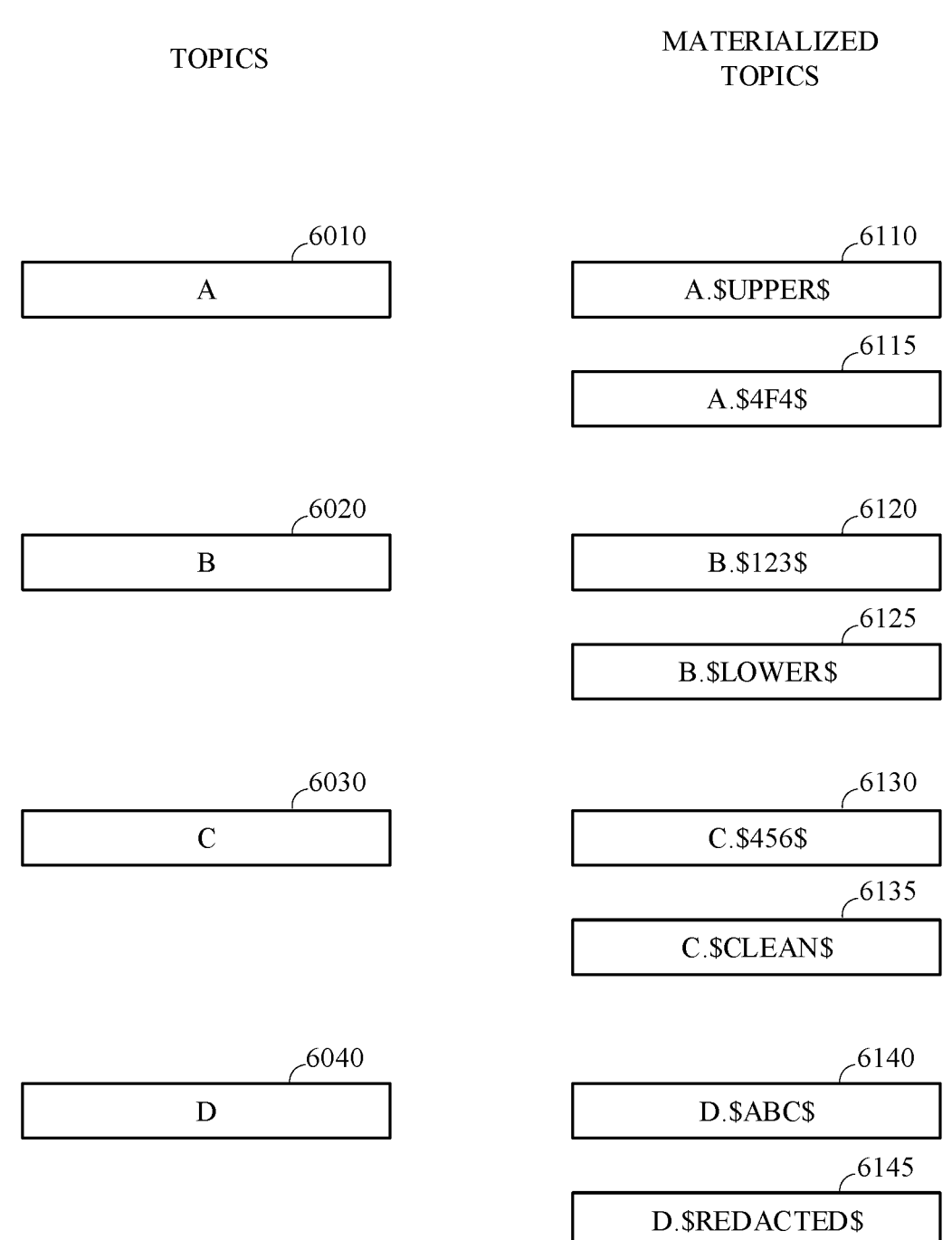
FIG. 6 is a block diagram illustrating examples of topics and materialized topics.

FIG. 6 is a block diagram illustrating examples of topics and materialized topics. Depicted topics include topics A 6010, B 6020, C 6030, and D 6040. As previously described each of topics A-D 6010-6040 may be assigned to one or more raft groups for processing. Depicted materialized topics include A.$UPPER$6110, A.$4F4$6115, B.$123$6120, B.$LOWER$6125, C.$456$6130, C.$CLEAN$6135, D.$ABC$6140, and D.$REDACTED$6145. In the depicted examples, a materialized topic is named using the associated topic name with an appended ".$ [label] $" where [label] is a specified, arbitrary, incremental, or other identifier for the materialized topic. This naming convention is an example, and other naming conventions, formats, or mechanisms are possible. For example, a materialized topic name may omit the associated topic name and may be associated with a topic using some mechanism other than the materialized topic name.

A materialized topic may be associated with a topic on the basis that the materialized topic includes data elements generated by a transform of the associated topic. For example, a script may be executed on data elements of a topic to produce data elements of the associated materialized topic. Materialized topics may be restricted such that data elements may only be added to materialized topics by a transform, such as may be produced by a script or coprocessor. In some implementations, only transformed data elements for a materialized topic may be stored and data elements received for a topic from which the transformed data elements are generated may not be stored in the associated topic or may be truncated after a given time period while the data elements for the materialized topic are stored for a longer period of time.

In some implementations, the materialized topic names may be automatically generated or may include a numeric, hexadecimal, or string based name that is unique but has no particular human readable meaning other than to uniquely identify a materialized topic, such as may be the case with example materialized topics A.$4F4$6115, B.$123$6120, C.$456$6130, and D.$ABC$6140. In some implementations, the materialized topic names may be assigned a name with a human readable meaning, such as may be the case with example materialized topics A.$UPPER$6110, B.$LOWER$ 6125, C.$CLEAN$6135, and D.$REDACTED$6145. For example, A.$UPPER$6110 may refer to a transformation of data elements by changing characters to uppercase format, B.$LOWER$6125 may refer to a transformation of data elements by changing characters to lowercase format, C.$CLEAN$6135 may refer to a transformation of data elements by normalizing a structure of text in a data element into a standardized format (e.g., phone numbers, addresses, or the like), and D.$REDACTED$6145 may refer to a transformation of data elements to redact personal information or other information such as for data privacy, legal compliance, or other purposes.

Figure 7:
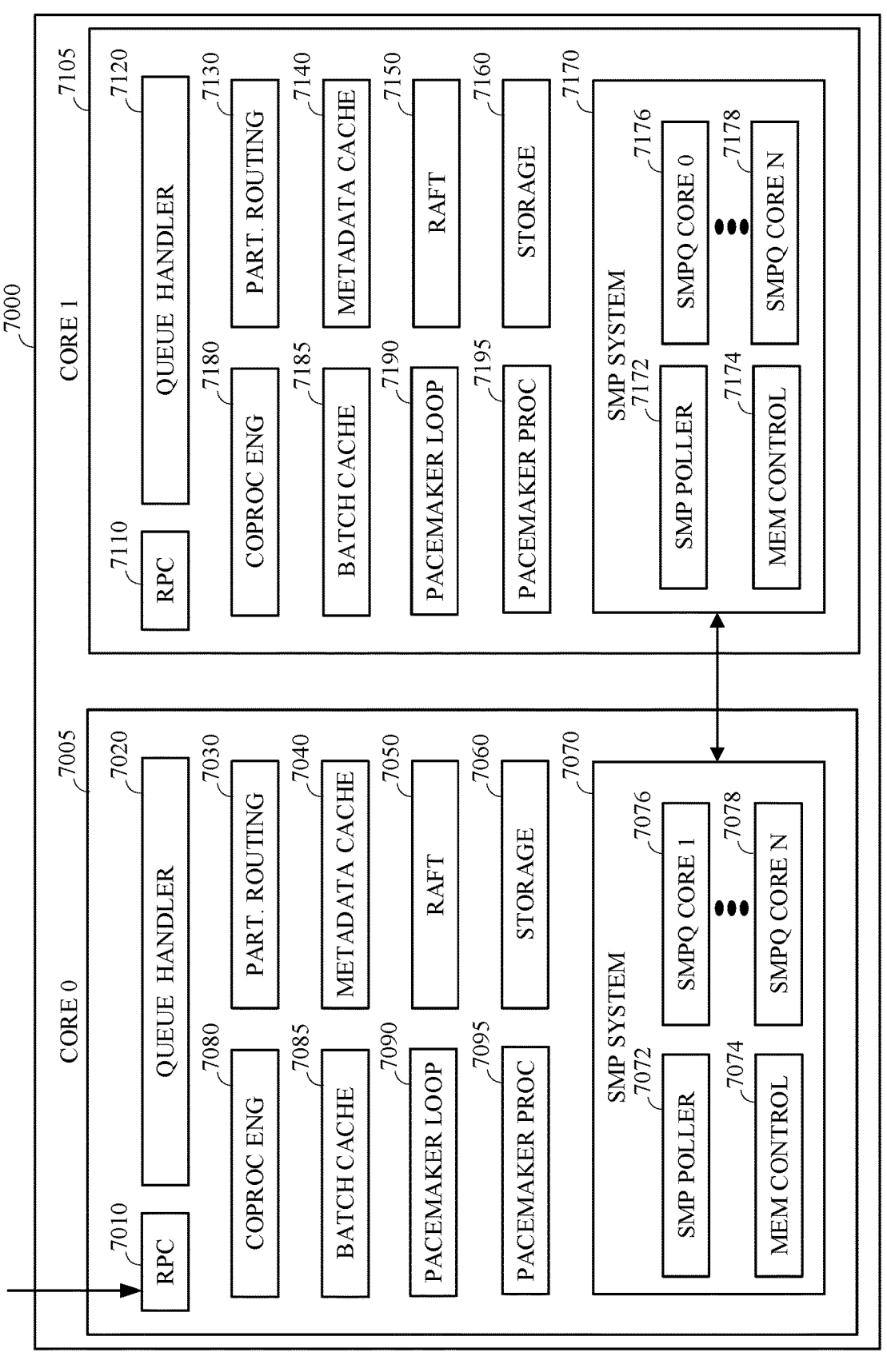
FIG. 7 is a block diagram of an example of components associated with a portion of a queuing system.

FIG. 7 is a block diagram of an example of components associated with a portion of a queuing system, such as the queueing system 5050. FIG. 7 includes an example server computing device 7000 having core 0 7005 and core 1 7105. Only two cores are pictured for ease of explanation, however in a typical implementation, there will be additional cores. Core 0 7005 and core 1 7105 each have a number of associated components, which may be implemented by instructions that are executed by a respective processing thread for each of the respective cores. In the implementation shown, each core has a single processing thread that is "pinned" for execution by that particular core for executing queuing system components associated with that core. Certain components may be executed by one or more other processes or threads, such as coprocessor engines 7080, 7180, as further described below.

Generally speaking, the processing threads of the cores may be implemented such that each are made up of or utilize processing units configured in the same or a similar way, although there may be exceptions such as those described below. The cores have respective RPC units 7010, 7110. The RPC (remote procedure call) unit handles communications received by an electronic communication unit. Generally speaking, a single core may be designated to receive all of the communications received by the server computing device 7000, in which case only one of the RPC units 7010, 7110 may be actively utilized. Depending on the operating system, it may not be possible to designate which core receives communications via the electronics communication unit, so the processing thread for each core may be configured such that any core is able to handle such communications.

The RPC units 7010, 7110 may handle the generation of "iobuf" data structures upon the receipt of a queue batch containing queue requests, such as described above with respect to FIG. 6. While this disclosure generally refers to a queue batch and queue request as describing the enqueuing or production of data on or to a queue in the queueing system, a queue batch and queue request may also include a request to dequeue or consume data on a queue or to provide administrative commands or functions to the queueing system. When queue requests are transmitted to a different computing device according to the fault tolerance protocol (e.g., raft), the RPC units 7010, 7110 (one or both, as the case may be) may also receive such requests as well.

A queue handler 7020, 7120 may be configured to handle the processing of queue requests. The queue handler 7020, 7120 may be configured to utilize a partition routing table 7030, 7130; a metadata cache 7040, 7140; raft 7050, 7150; a storage 7060, 7160; and/or a SMP (structured message passing) system 7070, 7170 to properly process requests. In implementations where transformation of queue requests are available, some or all of coprocessor engines 7080, 7180; batch cache 7085, 7185; pacemaker loop 7090, 7190; and pacemaker processor 7095, 7195 may be utilized in order to effectuate transformations of data elements of queue requests with respect to some or all topics for which queue requests are received.

Partition routing table 7030, 7130 provides a cache stored locally for each core that indicates which core(s) are designated to process which partition(s). For example, as previously described earlier, a queue request may concern a topic which may be segmented into multiple partitions which each process a subset of the queue requests for that topic. The partition routing table 7030, 7130 may be utilized to look up a partition identifier to determine, for example, whether a queue request is to be processed using the core on which the queue request is received or a different core. If the queue request is to be processed using a different core, a structured message will be sent to that different core using the SMP system 7070, 7170 and the queue request will not generally be further processed on the receiving core (e.g., by the queue handler 7020, 7120).

The metadata cache 7040, 7140 provides a list of valid topics for each partition that can be utilized by, for example, the queue handler 7020, 7120 to verify that the queue request includes a valid topic for the partition. The metadata cache 7040, 7140 stores the list local to each core in order to avoid memory locks and to store the data in a physically proximate manner to the core in order to reduce latency for checking the metadata cache, since it may be checked for each queue request.

Raft 7050, 7150 is the unit that handles the fault tolerant protocol for the queuing system. For example, raft may be used which is a mathematically proven fault tolerant protocol. This means that raft has a mathematical proof indicating that the protocol is fault tolerant—e.g., it is proven that there will be no data loss of received queue requests so long as the protocol is followed.

Raft 7050, 7150 may be members of the so-called management raft group (also referred to as "raft0"). The management raft group is responsible for assigning raft groups (each of which may represent a partition of a topic, depending on the implementation) to various computing devices and a core of the respective computing devices. For example, a first partition may be assigned to core 0 7005 and a second partition may be assigned to core 1 7105. For example, for each raft group, raft0 may include a variable indicating a number of computing devices included in the raft group and the IP addresses of each of the computing devices included in the raft group.

When a partition is assigned to a computing device, a single core on that computing device may be assigned to process queue requests assigned to that partition. Each raft group elects a leader and the remaining members of the raft group are followers, as further described in the previously referenced documentation relating to the raft protocol. Generally, the leader of the raft group will process queue requests for a given raft group and will coordinate synchronization (e.g., replication) of the processed queue requests to other members of the raft group. For example, a message may be sent to the other computing device members of the raft group with the information to be replicated. The message may be received, for example, by an RPC unit of the target computing device(s) and then be handled using a queue handler and/or raft unit of the receiving core(s) of the target computing device(s).

When a new topic and/or new partition is created or a queue request is received with a new topic and/or new partition, raft 7050, 7150 may operate to create a new raft group representative of the new partition and computing devices and cores may be assigned to the new raft group and reflected in the management raft group. The assignment of partitions to raft groups is advantageously stored in the management raft group, to which all computing devices and cores may be a member, so that when a queue request is received by a core, the information relating to the assignment of the queue request is available locally (and thus, the assignment for processing may be determined without accessing memory of a different core or making a network request for the information on a queue request by queue request basis).

Raft 7050, 7150 may also operate to enable reading or consumption of data previously processed by the queuing system and stored, e.g., in the storage 7060, 7160. For example, consumer groups can be created to consume data stored across multiple partitions/raft groups. The resulting read requests may be distributed amongst the various raft groups for processing. The raft group leader from each raft group can be configured to handle such requests, including making an indicating that a particular piece of data (key value pair) has been read.

The storage 7060, 7160 may be used by raft 7050, 7150 to store data received via processed queue requests. For example, the storage 7060, 7160 may take the form of a log of key value pairs. For example, the storage logs described with respect to the raft documentation may be utilized. The storage 7060, 7160 may also be used to reflect when the various items in the log have been read.

The SMP system 7070, 7170 is used to pass structured messages between the cores of a computing device. Each respective SMP system 7070, 7170 includes a SMP poller 7072, 7172 and a memory control 7074, 7174 along with various structured message passing queues (SMPQ) for other cores, such as SMPQ core 1 7076 and SMPQ core N 7078 for core 0 7005 and SMPQ core 0 7176 and SMPQ core N 7178 for core 1 7105. In the illustrated example, 'N' reflects the possible number of cores, in which case the illustrated elements of FIG. 4 would be extended to reflect the number of cores according to the number implemented.

The SMP poller 7072, 7172 operates to periodically poll the SMP queues of other cores that are assigned to the core of the SMP poller 7072, 7172. In the illustrated example, the SMP poller 7072 will poll SMPQ core 0 7176 and SMPQ core N 7178 and the SMP poller 7172 will poll SMPQ core 1 7076 and SMPQ core N 7078. The SMP system 7070, 7170 does not have a SMPQ assigned to its own core because it is not necessary for a core to pass structured messages to itself. The memory control 7074 determines the memory chunks associated with structured messages sent and received using the SMP system 7070, 7170. For example, when a structured message is sent from the SMP system 7070 to the SMP system 7170 using SMPQ core 1 7076 and the SMP poller 7172 to process a queue request present in one or more memory chunks allocated to core 0 7005, the mem control 7074 may be configured to determine the memory chunks in which the queue request is stored and increment the reference counters associated with those memory chunks.

Correspondingly, the memory control 7074 may be configured to, responsive to a message obtained by the SMP poller 7072 from SMPQ core 0 7176 that core 1 7105 has processed the queue request, decrement the reference counters associated with the respective memory chunks. This process may be repeated multiple times for various memory chunks depending on how many queue requests (or portions thereof) are stored in each memory chunk. By doing so, the SMP system 7070 is able to track which of the memory chunks allocated to core 0 7005 are still in use. The memory control 7074 may be further configured to utilize this information by, responsive to the decrementing of a reference count to zero, causing the deallocation of the memory associated with that memory chunk.

The coprocessor engines 7080, 7180 operate to execute scripts that transform data elements associated with topics to produce transformed data elements associated with materialized topics. The coprocessor engines 7080, 7180 may receive data elements from pacemaker loop 7090, 7190 for transformation and may return transformed data elements to pacemaker processor 7095, 7195. The coprocessor engines 7080, 7180 may execute one or more scripts associated with one or more topics and may be configured to execute different scripts based on the topic for which a data element is associated. The different scripts executed by coprocessor engines 7080, 7180 may have different latencies for processing data elements, for example based on different operations included in the different scripts.

The coprocessor engines 7080, 7180 may be implemented using a virtual machine such as V8, such as described above with respect to FIG. 5. As previously mentioned, coprocessor engines 7080, 7180 may be executed in a process or thread separate from the single per-core processing thread used to execute other components of the queueing system described with respect to FIG. 7 to provide isolation between coprocessor engines 7080, 7180 and other components described with respect to FIG. 7. For example, such isolation may permit other components described with respect to FIG. 7 to continue executing normally if an error causes one or more of coprocessor engines 7080, 7180 to stop executing normally. Such isolation is beneficial given that coprocessor engines 7080, 7180 is designed to execute user-provided scripts.

While coprocessor engines 7080, 7180 are described herein as being implemented on a per-core basis, other implementations are available. For example, a single coprocessor engine may be implemented for a given computing device instead of one per core. Depending on the implementation, a given coprocessor engine may handle transformation of data elements received by all cores of a computing device, some cores of a computing device, the same core of the computing device on which the coprocessor engine is executed, or some combination thereof.

Coprocessor engines 7080, 7180 (or alternative implementations thereof) may be limited in the use of computing resources of the computing device. For example, the process (es) or threads in which a coprocessor engine is executed may have a lower or substantially lower priority (e.g., at least an order of magnitude, such as 1:10, 1:100 or 1:1000) as compared to the pinned processing threads. For example, if a burst of queue requests are received that causes more resources of the queuing system to be consumed than are available with the coprocessor engine being executed at full speed (e.g., on a core or computing device thereof), the execution of one or more coprocessor engines may correspondingly be slowed down to permit the queue requests to be processed without delays caused by or exacerbated by coprocessor engine execution. In such an event, data elements that have not been transformed may be cached in memory until they can be processed by a coprocessor engine if sufficient memory is available, and if sufficient memory is not available, may not be stored in memory and may instead be retrieved from the topic from which such data elements were received and stored at a later time when sufficient computing resources are available to process such data elements by a coprocessor engine.

Scheduling of coprocessor engine execution and/or execution of other components using pinned processes per core may be enabled by using an application framework such as Seastar. For example, in some implementations, a coprocessor engine may be implemented using Seastar threads or fibers. In the event fibers are utilized, an implementation may utilize one fiber per script activated for a coprocessor, sharded across the cores of a computing device. For example, Seastar may allocate CPU time of the coprocessor engine according to an integer priority (such as the 1:1000 priority described above). The computing device and/or cores may be configured such that execution of a coprocessor engine will not block the execution of other components of the queuing system including the pinned thread per core. Other configurations may be utilized including prioritization of network, memory and disk resources for the pinned thread per core over the coprocessor engine(s).

In some implementations, the computing usage of a coprocessor engine may be influenced by adjusting the backpressure of data elements sent for transformation by a coprocessor engine as further described below with respect to pacemaker loop 7090, 7190.

In some implementations, coprocessor engines may be further restricted, for example in a period of time available for each transformation of a data element. For example, a transformation of a data element may be limited to a time period of 500 microseconds or less or some other time period designed to maintain a throughput of transformations consistent with or less than an expected throughput of queue requests that are to be transformed. A memory allocation to a coprocessor engine may also be restricted, for example to 4 GB of memory.

The batch cache 7085, 7185 may be utilized to store data elements in memory that are waiting to be transformed. The batch cache 7085, 7185 may be designed in a manner to limit the latency of transforming data elements by reducing the number and cost of memory and disk read/write operations to the extent possible given available resources. For example, transforms are performed on data elements in a first-in-first-out (FIFO) manner so that a materialized topic has a same order of transformed data elements as its associated topic's data elements. As such, the batch cache may be designed to prioritize keeping the oldest data elements not yet transformed in memory for quick access by a coprocessor engine for transformation. The batch cache may be optimized to store data elements in memory associated with a core on which the transformation of the respective data elements will occur based on a configuration of coprocessor engines and the core on which the respective data element was received. The batch cache may be organized in a hierarchical fashion to prioritize the first to be transformed data elements in memory with the lowest latency with respect to the core on which such data elements will be transformed to the extent such memory is available, followed by successive memory locations with higher latency. To the extent that sufficient memory is unavailable or not allocated to the batch cache to store all non-transformed data elements, such data elements may be retrieved from their associated topic log when memory is freed up from the processing of data elements stored in memory.

Implementations of batch cache 7085, 7185 may utilize system specific optimizations to improve operation of batch cache 7085, 7185 with respect to the latency of data elements in FIFO order. For example, Linux may be configured to not utilize page caching with respect to batch cache memory locations. Instead of utilizing a global allocation of cache, cache may be allocated or utilized on a per core basis where possible in order to match the storage of data elements to the core on which the data element will be transformed.

The pacemaker loop 7090, 7190 is designed to assemble received data elements for which there is an associated coprocessor script for processing by a coprocessor engine. In an implementation, pacemaker loop 7090, 7190 iterates through a coprocessor lookup map by topic (also referred to as NTP) and scripts associated with each topic. Offsets may be recorded to identify which data elements have been transformed and which have not so that the pacemaker loop 7090, 7190 is able to correctly identify which data elements to send to a coprocessor engine for transformation by which script(s). The pacemaker loop 7090, 7190 may be configured to maintain a certain backpressure of data elements sent for transformation to not overload the coprocessor engine with data elements waiting for transformation. The desired backpressure may be adjusted to achieve a desired computing resource utilization of coprocessor engine(s) as compared to available computing resources and utilization of computing resources by other components of the queuing system.

Data elements may be sent to a coprocessor engine with an associated script identifier and a pointer reference to the location of the data element to be transformed in the batch cache. The coprocessor engine to which data elements are sent may be identified based on a location of execution of the coprocessor engine which may be on a same computing device or core to which the data element to be transformed was received. The coprocessor engine may also be selected based on a memory location at which the data element is stored and an expected latency for the coprocessor engine to access that memory location.

The pacemaker processor 7095, 7195 is designed to receive transformed data elements from a coprocessor engine and store the transformed data elements in the appropriate materialized topic(s). Pacemaker processor 7095, 7195 may also update appropriate offsets relating to the transformed data elements reflecting the successful transformation of data elements at particular positions within a source topic. Pacemaker processor 7095, 7195 may also enforce an ordering of transformed data elements, e.g., using the offsets, so that an ordering of data elements in a materialized topic matches an ordering of data elements in an associated topic.

Pacemaker processor 7095, 7195, pacemaker loop 7090, 7190, and coprocessor engine 7080, 7180 may communicate using inter-process communication techniques designed to reduce the memory usage, computation, and latency of communication. For example, such communication may be designed to reduce or avoid network traffic or raft messages in raft groups. For example, SMP system 7070, 7170 may be extended for use with coprocessor engine 7080, 7180.

Implementations of coprocessor engines 7080, 7180, pacemaker loop 7090, 7190, and pacemaker processor 7095, 7195 are further described below with respect to FIGS. 8-10.

Figure 8:
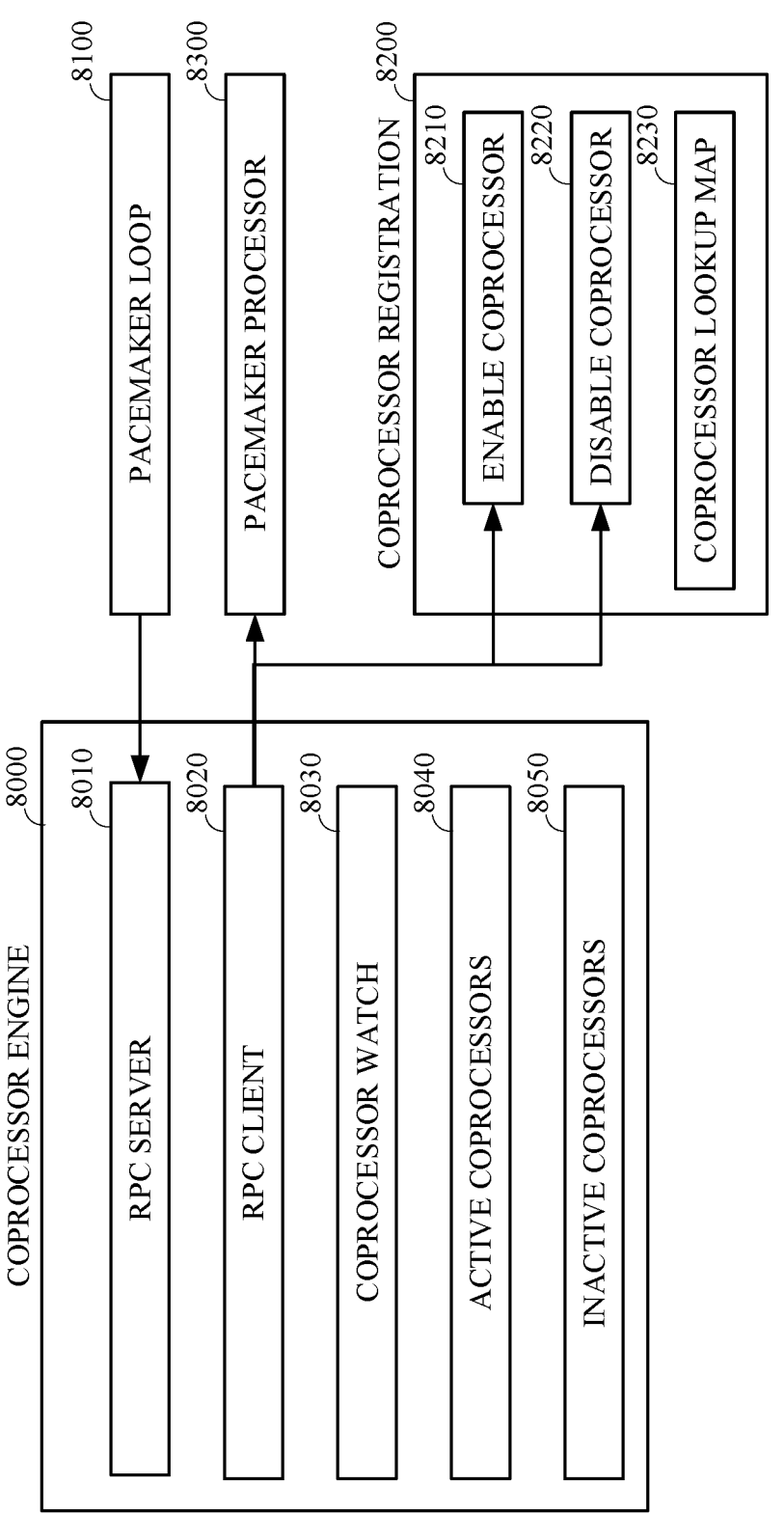
FIG. 8 is a block diagram illustrating a coprocessor engine and a coprocessor registration.

FIG. 8 is a block diagram illustrating a coprocessor engine 8000 and a coprocessor registration 8200. Coprocessor engine 8000 may include RPC server 8010, RPC client 8020, Coprocessor watch 8030, Active coprocessors 8040, and Inactive coprocessors 8050. Coprocessor registration 8200 may include Enable coprocessor 8210, Disable coprocessor 8220, and coprocessor lookup map 8230. Coprocessor engine 8000 may be an implementation of, for example, coprocessor engine 7080 and/or 7180.

RPC server 8010 may accept messages from pacemaker loop 8100. For example, pacemaker loop 8100 may be one of pacemaker loop 7090 or 7190. For example, pacemaker loop 8100 may transmit identifications of data elements to be transformed by coprocessor engine 8000. For example, for a data element, the information received by RPC server 8010 may include an indication of a script identifier to be used to transform the data element and a memory location of the data element in memory, such as in a batch cache 7085 or 7185.

RPC client 8020 may transmit information relating to transformed data elements to pacemaker processor 8300. For example, pacemaker processor may be one of pacemaker processor 7095, 7195. For example, the transmitted information may include a memory location of a transformed data element, such as may be stored in batch cache 7085 or 7185, and an identification of a materialized topic for which the transformed data element may be stored. The transformed data element may also include an indication of an offset of the data element from which it was transformed in a topic associated with the materialized topic. If the output of a script is to filter or remove a data element, such an indication may also be returned, for example in the form of an empty value. If the execution of a script returns an error, a null value may be returned in order to signify that an error occurred.

Coprocessor watch 8030 may operate to monitor a file system or a topic used to enable and disable scripts for topics. For example, in some implementations, a new script may be placed in a filesystem directory, detected by coprocessor watch 8030, and registered via a message to enable coprocessor 8210. In another example, a script to be removed may be placed in a different file system directory, detected by coprocessor watch 8030, and deregistered via a message to disable coprocessor 8220. The format of file name and/or directory utilized to identify which action to take and with respect to what topic(s) may vary.

An alternative implementation is to utilize one or more compacted topics for updates to scripts and to register and deregister coprocessors/scripts for particular topics. For example, a compacted topic may be utilized to store a latest version of a script having a particular script identifier. New versions of the script may be added to the compacted topic and may be detected by coprocessor watch 8030. Coprocessor watch 8030 may then update the associated script(s) in active coprocessors 8040 so that future transformations using such script(s) utilize the updated script(s). A compacted topic may also be utilized to store state information regarding coprocessors/scripts/topics, such as in the form of a coprocessor lookup map 8230 and/or as further described later with respect to FIG. 9 and coprocessor lookup map 9000. Coprocessor watch 8030 may monitor such a compacted topic and update active coprocessors 8040, inactive coprocessors 8050, and interact with coprocessor registration 8200 accordingly.

In some implementations, coprocessor watch 8030 may operate to disable a coprocessor for a script when an error occurs for the script (e.g., if an execution time exceeds a maximum execution time or a utilized memory exceeds an available memory). For example, coprocessor 8030 may be configured to receive or identify when an error for a script occurs and in response may disable the associated script via disable coprocessor 8220 and may remove the associated coprocessor for the script from active coprocessors 8040 and may add the associated coprocessor to inactive coprocessors 8050. In some implementations, coprocessor watch 8030 may not respond to errors and pacemaker loop 8100 and/or pacemaker processor 8300 may be responsible for responding to errors. Such an implementation may be desirable to simplify the implementation of coprocessor engine 8000.

Active coprocessors 8040 include instances of scripts that are registered and being utilized for topics and inactive coprocessors 8050 include instances of scripts that are not currently being utilized for any particular topic. For example, active coprocessors 8040 may include a wasm object for scripts which may be invoked against a data element and may have associated metadata indicating the topics and materialized topics on which such active coprocessors operate and produce transformed data elements for. Individual coprocessors in active coprocessors 8040 may be executed in an isolated manner from each other or from a pinned thread per core used for executing other components of the queuing system based on a source of the scripts executing in the respective coprocessors and/or a type of function included in respective coprocessor scripts. For example, scripts executing only system functions for transformation of data (e.g., toupper( ), tolower( )) may warrant a lower level of isolation as compared to scripts performing more complex functions. For example, a built-in script provided with the queuing system may warrant a lower level of isolation than a script provided by a user. Such variability in isolation may be desirable as operation of coprocessors at lower levels of isolation from each other may be more efficient than fully isolating all coprocessors from each other.

Coprocessor registration 8200 includes functionality for enabling and disabling coprocessors 8210, 8220, such as by adding and removing scripts from a coprocessor lookup map 8230 with respect to one or more topics. The addition or removal of a script from coprocessor lookup map 8230 may then be detected by individual coprocessor engines, e.g., using coprocessor watch 8030, which may result in a script being added or removed from one or more of active coprocessors 8040 or inactive coprocessors 8050 and thus may affect whether data elements associated with a particular topic are transformed or sent by pacemaker loop 8100 to coprocessor engine 8000 for transformation. For example, a first script may be identified for a first topic based on the first script being associated with the first topic in the coprocessor lookup map and coprocessor watch 8030 may as a result activate the first script in active coprocessors 8040.

For example, a command line function may be provided to enable the deployment of a new or updated script, such as rpk wasm deploy<script>—name<name>. This command line function may operate to deploy the script in a file system location or a compacted topic where it can be detected by coprocessor watch 8030 for addition to active or inactive coprocessors.

For example, a command line function may be provided to disable a script, such as rpk wasm remove<name>. This command line function may operate to remove or disable the script in a file system location or a compacted topic where it can be detected by coprocessor watch 8030 for removal from active coprocessors to inactive coprocessors. When a script is disabled, previously transformed data elements may be maintained in their respective materialized topics. Alternatively in some implementations, disabling a script may result in the removal of associated transformed data elements and materialized topics.

For example, a command line function may be provided to list deployed scripts, such as rpk wasm list. This command line function may utilize a coprocessor lookup map and/or an associated compacted topic with status information (e.g., which may be called coprocessor_status_topic) in order to produce a list of coprocessors and scripts and status information. Coprocessor engines 8210, 8220 and/or active or inactive coprocessors 8040, 8050 may be configured to publish status information and other metadata to this compacted topic to provide visibility into the operation of coprocessor engines.

For example, enable coprocessor 8210 may be invoked by a call such as enable_coprocessors(list<script_id, list<topic>>). For example, disable coprocessor 8220 may be invoked by a call such as disable_coprocessors (list<script_id>). For example, coprocessor lookup map 8230 may be implemented in a manner described with respect to FIG. 9. Coprocessor lookup map 8230 may take the form of a pointer to a memory location or a topic for which the information associated with the lookup map is stored.

Additional functions may be made available for managing coprocessor engine 8000. For example, a heartbeat function may be provided in order to monitor the status of coprocessor engine 8000 by, e.g., pacemaker loop 8100 or pacemaker processor 8300. The heartbeat function may provide an indication of the last transformation performed or may not respond if the coprocessor engine 8000 is not functioning properly. If the hearbeat response indicates that the coprocessor engine 8000 may not be functioning properly, pacemaker loop 8100 or pacemaker processor 8300 may reset the coprocessor engine 8000 and may resend data elements for transformation that were not previously received and/or saved according to the offsets for respective scripts and topics. For example, a disable_all function may be provided to quickly inactivate all coprocessors in order to enable a recovery by re-enabling (either individually or using another bulk function) respective coprocessors.

Figure 9:
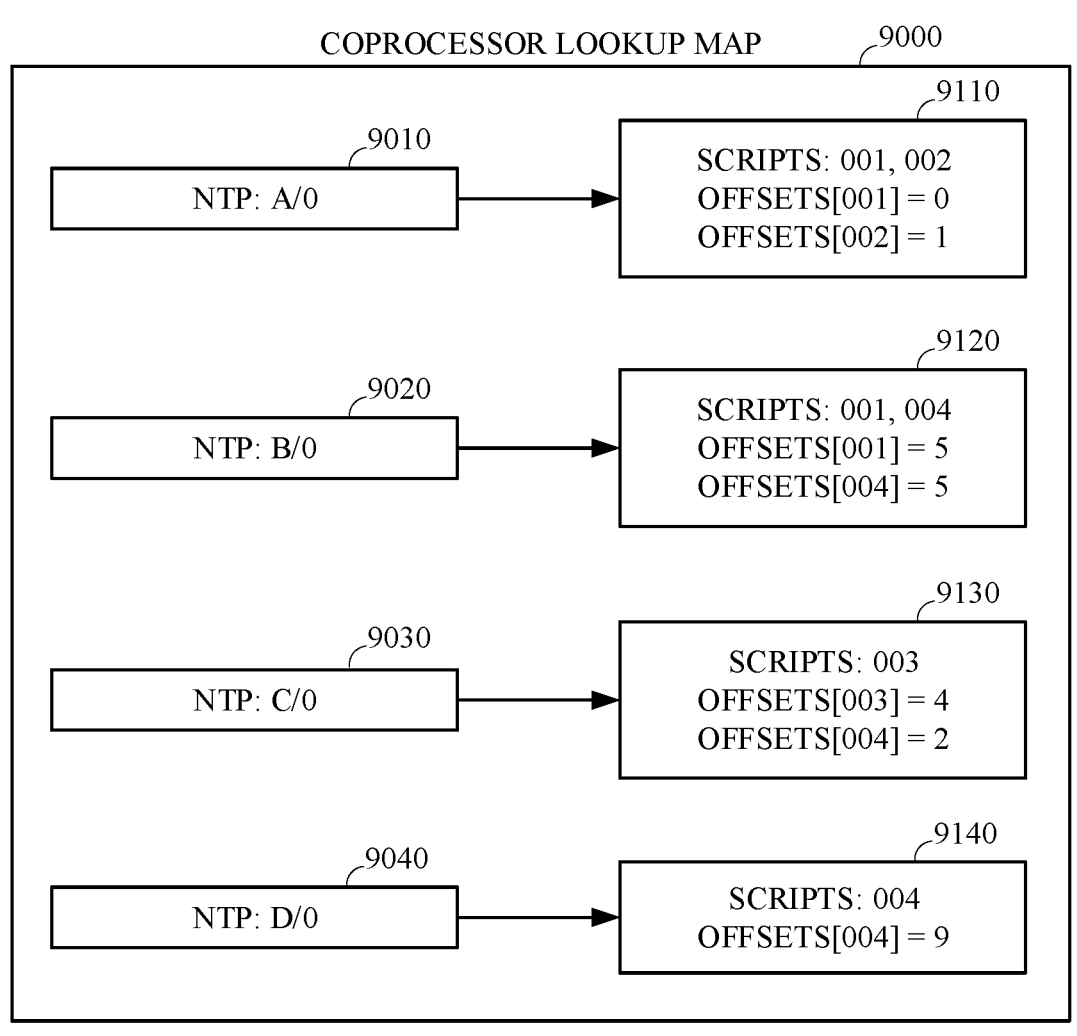
FIG. 9 is a block diagram of a coprocessor lookup map.

FIG. 9 is a block diagram of a coprocessor lookup map 9000. For example, coprocessor lookup map 9000 may be an implementation of or may be referenced by coprocessor lookup map 8230.

Coprocessor lookup map 9000 includes references to topics A/0 9010, B/0 9020, C/0 9030, and D/0 9040. The /0 in the topics refers to a partition number. In the provided example there is one partition per topic, however in implementations a topic may have multiple partitions in which data elements are stored independently. Topics 9010-9040 may be stored in the form of an object with one or more data elements or pointers referencing information regarding transformations for such topics such as depicted in coprocessor information 9110, 9120, 9130, and 9140 which relate respectively to topics 9010, 9020, 9030, and 9040. Coprocessor lookup map 9000 may be stored, for example, in memory, on disk, or in a compacted topic, or some combination thereof. For example, a copy of coprocessor lookup map 9000 may be kept in memory for use and may be periodically stored in a topic for durable storage if it needs to be recovered in the event of an error resulting in the loss of the coprocessor lookup map from memory.

For example, each topic may have an associated indication or list of script identifiers that are active with respect to such topic for transformation. In the depicted example, topic A/0 9010 has scripts 001 and 002 active as shown in coprocessor information 9110, topic B/0 has scripts 001, 004 active, topic C/0 has script 003 active, and topic D/0 has script 004 active. The identified active scripts will be executed against incoming data elements for their respective topics and some scripts may be executed against multiple topics (e.g., script 001).

Each script may have a stored offset in the coprocessor information for its respective topic. For example, in the shown example, script 001 has an offset of 0 for topic A/0 as shown in coprocessor information 9110 and an offset of 5 for topic B/0 as shown in coprocessor information 9120. Offsets may be utilized, e.g., by pacemaker loop 8100 and pacemaker processor 8300 to determine which data elements have not yet been transformed and which data elements need to be sent to a coprocessor engine to be transformed. Offsets may be updated once transformed data elements are received by pacemaker processor 8300 and stored so as to protect against an error condition where a data element may have been sent for transform or may have been transformed but was not saved to an associated materialized topic. Offsets may also exist for scripts that are not currently active, for example, if a script was previously active—in which case the offset may identify a last data element for which the inactive script produced a transformed data element.

When a script is added for a topic, the offset for that script/topic combination may be set, for example, by obtaining an initialization offset and using that initialization offset to set the offset for the coprocessor for the script/topic combination. For example, the initialization offset may be a current offset for the topic or an earlier offset for the topic if transformation of previously received data elements is desired. Alternatively, if a script was previously enabled for the script/topic combination, there may be a pre-existing offset for that coprocessor, and the pre-existing offset may be utilized.

In some implementations, additional information may be stored for a topic and/or a topic/script combination. For example, a data policy may be stored for configuring or controlling the operation of a coprocessor engine with respect to the operation of a script with respect to a topic. For example, a data policy may be utilized to manage on a granular basis a timeout or amount of memory that can be utilized by a script with respect to a particular topic. The data policy may be updated by writing to a compacted topic or by using a command line function, for example.

Figure 10:
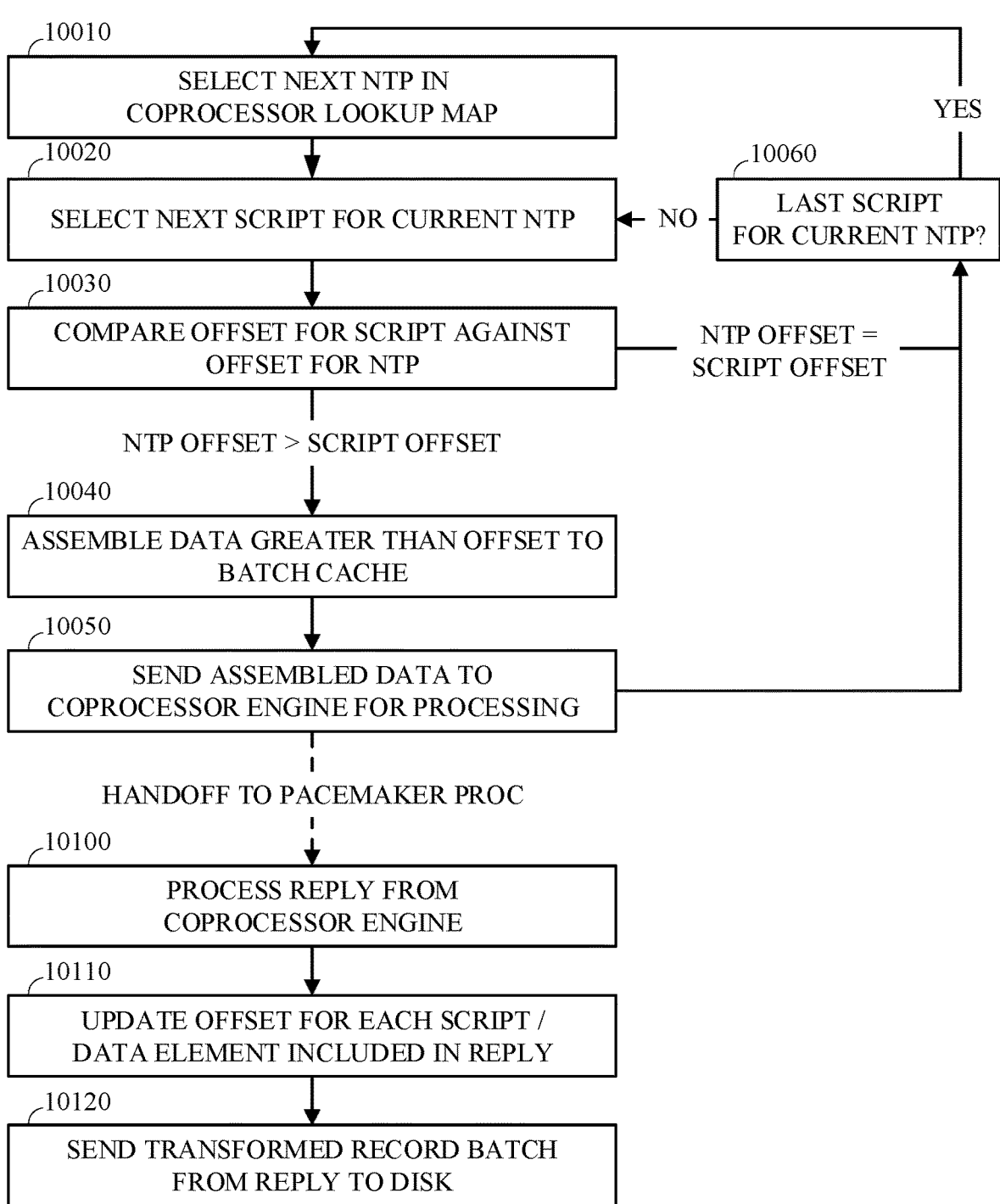
FIG. 10 is a flowchart of a process for transforming topic data.

FIG. 10 is a flowchart of a process for transforming topic data.

At step 10010, a next NTP (topic) in a coprocessor lookup map is selected, such as the coprocessor lookup map 9000 or 8200 as previously described.

At step 10020, a next script in a coprocessor lookup map is selected for the currently selected topic, such as from the coprocessor lookup map 9000 or 8200 as previously described.

At step 10030, an offset for the selected script is compared against a current offset for the selected topic. If the topic offset equals the script offset, it is determined that no data elements for the currently selected script and topic combination need to be assembled for transformation and control passes to step 10060 for further processing. If the topic offset is greater than the script offset, it is determined that there are data elements for the currently selected script and topic combination that need to be assembled for transformation and control passes to step 10040.

In some implementations additional or different conditions may be utilized to determine whether to continue to step 10040. For example, step 10030 may evaluate a backpressure of data elements previously sent for transformation for the currently selected script and topic combination and may not continue to step 10040 if there are too many data elements waiting for transformation. For example, one or more additional offsets may be maintained, for example to track data elements sent for transformation but for which a transformed data element is not yet received. For example, offsets may only be updated at a later stage and step 10030 may be reached again for a particular script and topic combination before previously assembled data elements are transformed and offsets are correspondingly updated and a tracking mechanism may be utilized to avoid sending duplicate data elements to a coprocessor engine. Likewise, mechanisms may be utilized in order to permit re-sending data elements for transformation, for example in the event where a coprocessor engine encounters an error or where, for example a later transformed data element is received but an earlier transformed data element is not.

Data elements that are to be transformed by different scripts and/or for different topics may be assembled or sent for transformation at different rates, for example based on the rate at which data elements are received for a topic, the rate or latency at which data elements are transformed by one or more different coprocessors activated for one or more scripts.

At step 10040, data elements are assembled to be sent to a coprocessor engine, for example, data elements that have an offset greater than the current offset for the currently selected script and topic combination. In some implementations all the data elements between the script/topic offset and the topic offset may be assembled. In some implementations, a maximum number or other throttling mechanism may be utilized to assemble a fewer number of data elements for transformation, e.g., to maintain a certain level of backpressure. The assembled data elements may take the form, for example of a script identifier and data element memory location tuple of data for each data element to be transformed. Once the data elements are assembled, control passes to step 10050.

At step 10050, the assembled data elements are sent to a coprocessor engine for processing. For example, the tuples of script identifiers and memory locations of data elements assembled at step 10040 may be sent. The mechanism of sending the assembled data elements may be as described with respect to FIG. 8. Once the assembled data elements are sent, control passes to step 10060.

At step 10060, if there are additional scripts not yet selected for the selected topic, control passes to step 10020 to select the next script; otherwise control passes to step 10010 to select the next topic in the coprocessor lookup map. In the depicted process, steps 10010-10060 are performed as described in a loop such that once all topics and scripts have been selected once, the process continues with topics and scripts previously selected. As depicted, topics and scripts are selected in an incremental fashion, however other mechanisms of selection are available including prioritized selection, random selection and round robin. Other implementations than a loop may also be utilized including a timed selection or interrupt or event driven selection (e.g., based on the receipt of a queue request or certain number of queue requests).

Steps 10010-10060 may be carried out, for example, by a pacemaker loop, such as pacemaker loop 8100 or 7090, 7190 as previously described. Steps 10100-10120 may be carried out, for example, by a pacemaker process, such as pacemaker processor 8300 or 7095, 7195. Steps 10010-10060 and steps 10100-10120 may be carried out independently. In other words, the handoff between step 10050 and step 10100 may be a logical construct and may not be represented by communication between steps 10050 and step 10100 in an implementation.

At step 10100, a reply from a coprocessor engine is processed. For example, step 10100 may be initiated on an event or interrupt basis upon receipt of a rpc message from a coprocessor engine. The replay may include, for example, an indication of a data element that was transformed and the topic to which the data element belonged, a script identifier for the transformation, an offset of the data element, an indication of a materialized topic to which the transformed data element belongs, a transformed data element, or some combination thereof.

At step 10110, applicable offsets are updated for the script/data elements included in the reply. For example, if a transformed data element is received for topic A at offset 5 for script 001 and the existing offset for topic A and script 001 is offset 4 in the coprocessor lookup map, the offset in the coprocessor lookup map for the topic/script combination may be updated to offset 5. For example, step 10110 may include checking to verify that data elements from prior offsets have been transformed. For example, if the existing offset in the coprocessor lookup map were 3, it may be determined that a transformed data element for offset 4 has not been received and the reply may be cached pending receipt of the earlier transformed data element or an error may be raised. Alternatively, the pacemaker loop may be instructed to request a (duplicate) transformation of the prior data element not received.

At step 10120, the transformed data element(s) are sent to disk. For example, the transformed data elements may be added to a log for a materialized topic for which the transformed data elements are associated. For example, the pacemaker processor may update the logs directly without utilizing a raft group and/or may interact, for example directly with storage 7060, 7160 to effectuate the storage of the transformed data elements to the appropriate materialized topic logs. For example, by bypassing raft 7050, 7150 for storage of materialized topic data elements, compute, memory, and network resources that would otherwise be consumed by raft 7050, 7150 may be saved or avoided. Usage of raft 7050, 7150 by the pacemaker processor is not necessary because of the metadata stored in the coprocessor lookup map which preserves the completeness and correctness of the materialized topics and will be utilized by pacemaker loop and pacemaker processor to resend data elements for transformation in the event of an error or loss of a core or computing device. For example, the coprocessor lookup map may be maintained in one or more topics which are processed and protected by raft 7050, 7150.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The arrangements shown in the figures should not be viewed as limiting. Other embodiments can include more or less of each element shown in a given figure. Further, some of the illustrated elements can be combined or omitted. Yet further, an example embodiment can include elements that are not illustrated in the figures.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for transforming data within a queuing system comprising:
    activating a first coprocessor for a first topic in the queuing system based on a first script identified for the first topic, wherein the first topic is identified in the queuing system by a first name and the first script is associated with the first topic in a coprocessor lookup map;
    obtaining a first initialization offset identifying a position in a queue of data elements associated with the first topic;
    storing a first coprocessor offset based on the first initialization offset;
    obtaining a last offset identifying a position of a last received data element in the queue of data elements associated with the first topic;
    executing the first coprocessor against a first data element from the queue of data elements by comparing the first coprocessor offset and the last offset to produce a first transformed data element; and
    storing the first transformed data element in a first materialized topic associated with the first topic, wherein the first materialized topic is identified in the queuing system by a second name different from the first name of the first topic, and wherein storage of the first data element persists at least until after the first transformed data element is stored.

2. The method of claim 1, further comprising:
    activating a second coprocessor for the first topic in the queuing system based on a second script identified for the first topic;
    obtaining a second initialization offset identifying a position in the queue of data elements associated with the first topic;
    storing a second coprocessor offset based on the second initialization offset;
    executing the second coprocessor against the first data element from the queue of data elements by comparing the second coprocessor offset and the last offset to produce a second transformed data element; and storing the second transformed data element in a second materialized topic associated with the first topic.

3. The method of claim 2, wherein the first coprocessor and the second coprocessor have different latencies for processing data elements, and wherein the first coprocessor offset and the second coprocessor offset independently change based at least on the respective latencies for the first and second coprocessors.

4. The method of claim 3, wherein the first and second coprocessors execute asynchronously with respect to a receipt of data elements on which the first and second coprocessors are executed against and data elements are cached in memory pending execution of the first and second coprocessors.

5. The method of claim 4, wherein at least some data elements are not cached in memory if sufficient backpressure exists for the first coprocessor or the second coprocessor.

6. The method of claim 5, wherein a pacemaker processor provides data elements to the first coprocessor at a rate based on maintaining a desired backpressure of data elements waiting for the first coprocessor.

7. The method of claim 2, wherein the first and the second coprocessors are limited to an execution latency per data element less than an expected rate of receipt of data elements on which the first and second coprocessors are executed against.

8. The method of claim 2, wherein the first and the second coprocessors are limited to a maximum execution latency of 500 microseconds.

9. The method of claim 1, wherein executing the first coprocessor is performed by one or more coprocessor processes isolated from one or more queuing processes that perform at least one other step.

10. The method of claim 9, wherein the one or more coprocessor processes have a priority at least an order of magnitude less than the one or more queuing processes.

11. The method of claim 1, further comprising:

storing the first script in a compacted queue topic; and monitoring for updates to the compacted queue topic, by a processing thread executed by a first core of a first computing device;

wherein the first script is identified for the first topic based on receipt of an update to the compacted queue topic based on the storing of the first script in the compacted queue topic.

12. The method of claim 1, wherein a processing thread that receives new data elements is restricted from writing to the first materialized topic.

13. The method of claim 1, wherein a processing thread that received and stored the data elements executes on a computing device.

14. The method of claim 13, wherein the processing thread operates on a first core of the computing device and utilizes a mathematically proven fault tolerant protocol, wherein storing the first transformed data element in a first materialized topic does not utilize the mathematically proven fault tolerant protocol.

15. The method of claim 1, further comprising:

disabling the first coprocessor responsive to an error associated with the first coprocessor.

\* \* \* \* \*